United States Patent
Brookens et al.

(10) Patent No.: US 7,111,459 B1
(45) Date of Patent: Sep. 26, 2006

(54) ZERO TURN HYDROSTATIC TRANSMISSION BYPASS LINKAGE

(75) Inventors: Joseph L. Brookens, Taylorville, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 5 days.

(21) Appl. No.: 11/022,518

(22) Filed: Dec. 22, 2004

(51) Int. Cl.
*F16D 31/02* (2006.01)
(52) U.S. Cl. .............................. 60/489; 60/486; 60/484
(58) Field of Classification Search ................. 60/484, 60/486, 489
See application file for complete search history.

(56) References Cited

U.S. PATENT DOCUMENTS

| | | | | |
|---|---|---|---|---|
| 2,421,013 | A | * | 5/1947 | Cornwell ...................... 60/486 |
| 3,065,700 | A | * | 11/1962 | Blenkle ........................ 60/486 |
| 3,360,933 | A | * | 1/1968 | Swanson et al. .............. 60/489 |
| 3,605,519 | A | * | 9/1971 | Haggen ........................ 60/486 |
| 3,616,869 | A | * | 11/1971 | Rilling ......................... 60/486 |
| 3,808,813 | A | * | 5/1974 | Spinks ......................... 60/489 |
| 4,809,796 | A | * | 3/1989 | Yamaoka et al. ............. 60/484 |
| 5,201,692 | A | | 4/1993 | Johnson et al. |
| 5,423,182 | A | | 6/1995 | Hauser et al. |
| 5,497,623 | A | | 3/1996 | Hauser et al. |
| 5,509,496 | A | | 4/1996 | Erickson et al. |
| 5,588,294 | A | | 12/1996 | Sakakura et al. |
| 5,957,229 | A | * | 9/1999 | Ishii ............................. 60/484 |
| 6,145,312 | A | * | 11/2000 | Hauser et al. ................ 60/487 |
| 6,185,936 | B1 | | 2/2001 | Hauser et al. |
| 6,256,989 | B1 | | 7/2001 | Hauser et al. |
| 6,370,876 | B1 | | 4/2002 | Langenfeld |
| 6,374,604 | B1 | | 4/2002 | Poplawski et al. |
| 6,681,570 | B1 | | 1/2004 | Takada et al. |
| 6,775,976 | B1 | * | 8/2004 | Phanco et al. ................ 60/484 |

\* cited by examiner

*Primary Examiner*—Edward K. Look
*Assistant Examiner*—Michael Leslie
(74) *Attorney, Agent, or Firm*—Neal, Gerber & Eisenberg LLP

(57) ABSTRACT

Disclosed is a vehicle. The vehicle comprises a first hydraulic pump, a first hydraulic motor, a first axle shaft, a second hydraulic pump, a second hydraulic motor, a second axle shaft, a first bypass, a first linkage, a second bypass and a second linkage. The first hydraulic motor is connected to the first hydraulic pump by a first hydraulic porting. The first axle shaft is driven by the first hydraulic motor. The second hydraulic motor is connected to the second hydraulic pump by a second hydraulic porting. The second axle shaft is driven by the second hydraulic motor. The first bypass is associated with the first hydraulic porting. The first linkage is connected to the first bypass. The second bypass is associated with the second hydraulic porting. The second linkage is connected to the second bypass. The first bypass and the second bypass are actuated substantially simultaneously by a single actuating mechanism.

20 Claims, 6 Drawing Sheets

ZERO TURN HYDROSTATIC TRANSMISSION BYPASS LINKAGE

FIELD OF THE PRESENT INVENTION

The Present Invention relates generally to zero-turn hydrostatic transmission ("HZT") systems and transaxles, and, in particular, to a bypass system for use in such systems and transaxles. Specific exemplary embodiments discussed herein relate to vehicles such as walk-behind lawn mowers, riding lawn mowers, snow throwers, tractors or any other vehicle desiring a zero-turn radius, using a pair of hydrostatic transaxles.

BACKGROUND OF THE PRESENT INVENTION

The description of references in this Section is not intended to constitute an admission that any patent, publication or other information referred to herein is "Prior Art" with respect to the Present Invention, unless specifically designated as such.

Hydrostatic transmission ("HST") systems and transaxles are well known in the industry, and are more fully described in, e.g., U.S. Pat. No. 5,314,387, the contents of which are incorporated herein by reference in its entirety. In general, a typical HST system possesses, inter alia, a hydraulic pump and a hydraulic motor mounted in a housing. The hydraulic pump and hydraulic motor are hydraulically-linked through a generally-closed hydraulic circuit, and both consist of a rotatable body with a plurality of reciprocating pistons mounted therein. A hydraulic fluid, such as oil, is maintained in the generally-closed hydraulic circuit, and the HST generally has a sump, or reservoir, with which the generally-closed hydraulic circuit can exchange oil. In certain instances, this sump may be formed by the housing itself.

The hydraulic pump is usually driven by an external motive source, such as a pulley and belt system or a plurality of drive shafts connected to an internal combustion engine. The reciprocating pistons engage a moveable swash plate and, as the hydraulic pump is rotated by an input source driven by the engine, the reciprocating pistons engage the swash plate. Other HST designs may use a radial piston or ball piston pump and motor design, but the general operation is, in any event, similar, and the Present Invention is not limited to use with a specific design.

Movement of the reciprocating pistons creates movement of the hydraulic fluid from the hydraulic pump to the hydraulic motor, causing the rotation thereof. Motor pistons are engaged against a fixed plate, and rotation of the hydraulic motor drives an output shaft engaged thereto. This output shaft may be linked to mechanical gearing and output axles, which may be internal to the HST housing, as in an integrated hydrostatic transaxle ("IHT"), or external thereto.

Further, the system is fully reversible in a standard HST. This means that, when the swash plate against which the pump pistons move is moved, the rotational direction of the motor can be changed, such as in a forward or reverse direction. In addition, there is a "neutral" position where the pump pistons are not moved in an axial direction, so that rotation of the pump does not create any movement of the hydraulic fluid.

HZTs are also known in the industry. Generally, an HZT is utilized in connection with a vehicle to provide for the independent control of each of the drive wheels of a vehicle. By way of example, HZTs are described in U.S. Pat. Nos. 5,078,222 and 6,775,976, the contents of which are both incorporated herein by reference in their entireties. Generally speaking, the HZTs in the aforementioned references comprise two reduction drives powered by independent self-contained hydraulic power units. Additionally, Eaton has developed and marketed zero-turn transaxles, commonly known as Eaton Models 771 and 781. The Eaton Model 771 is an assembly with one pump and one motor where two Eaton Model 771 HZT assemblies, a right and a left, are required for zero-turn drive. The Eaton Model 781 consists of two units similar to the Eaton Model 771 joined together to make one assembly.

Each of the HZTs described above possesses the generally-closed hydraulic circuit discussed above. Thus, each individual HZT possesses two distinct sides, namely, a high pressure side in which oil is being pumped from the hydraulic pump to the hydraulic motor, and a low pressure, or vacuum, side, in which oil is being returned from the hydraulic motor to the hydraulic pump. When the swash plate angle is reversed, the flow out of the hydraulic pump reverses so that the high pressure side of the circuit "becomes" the vacuum side, and vice versa. This generally-closed hydraulic circuit can be formed as porting within the HZT housing, internal to a center section on which the hydraulic pump and hydraulic motor are rotatably mounted or in other ways known in the industry. Check valves may also be used to draw hydraulic fluid into the low pressure side to make up for fluid lost due to leakage, for example. Such check valves may be located so that they directly contact the porting or they may be located separate from the porting and connected through additional bores to the closed circuit. Additionally, an HZT may be provided with a means by which the closed loop may be opened to the sump or the high and low pressure side connected together. The means is commonly known as a "bypass" or a "bypass circuit."

There is a need to provide a means to open, or bypass, this closed circuit in certain circumstances. This is necessary because when the vehicle is stopped, the oil in the closed circuit provides for hydraulic braking, making it difficult to manually move the vehicle. Mechanical bypass designs are known in the art and are described in, for example, U.S. Pat. No. 5,423,182, the contents of which are incorporated herein by reference in its entirety. Such designs generally achieve bypass by opening the closed hydraulic circuit to the sump by, e.g., opening check valves in the circuit or by opening a shunt between the high pressure and low pressure sides of the circuit. However, due to the nature of HZT configurations, the need exists for an improved bypass linkage assembly that can obtain bypass through the pull of only one handle.

SUMMARY OF THE PRESENT INVENTION

The Present Invention addresses the shortcomings in prior bypass linkage designs, as an improved bypass linkage for an HZT is disclosed herein.

Thus, in accordance with the tenets and teachings of the Present Invention, disclosed is a vehicle comprising first and second zero-turn transaxles and a bypass linkage assembly.

Other objects and advantages of the Present Invention will be apparent from the following Description Of Exemplary Embodiments Of The Present Invention, with reference to the attached Figures and Claims disclosed herein.

BRIEF DESCRIPTION OF THE DRAWINGS

In the interest of enabling one of skill in the art to practice the Present Invention, exemplary embodiments are illustrated and described. For clarity and brevity, details apparent to those of skill in the art without undue experimentation are generally omitted from the Figures and Description.

DESCRIPTION OF EXEMPLARY EMBODIMENTS OF THE PRESENT INVENTION

Figure 1:
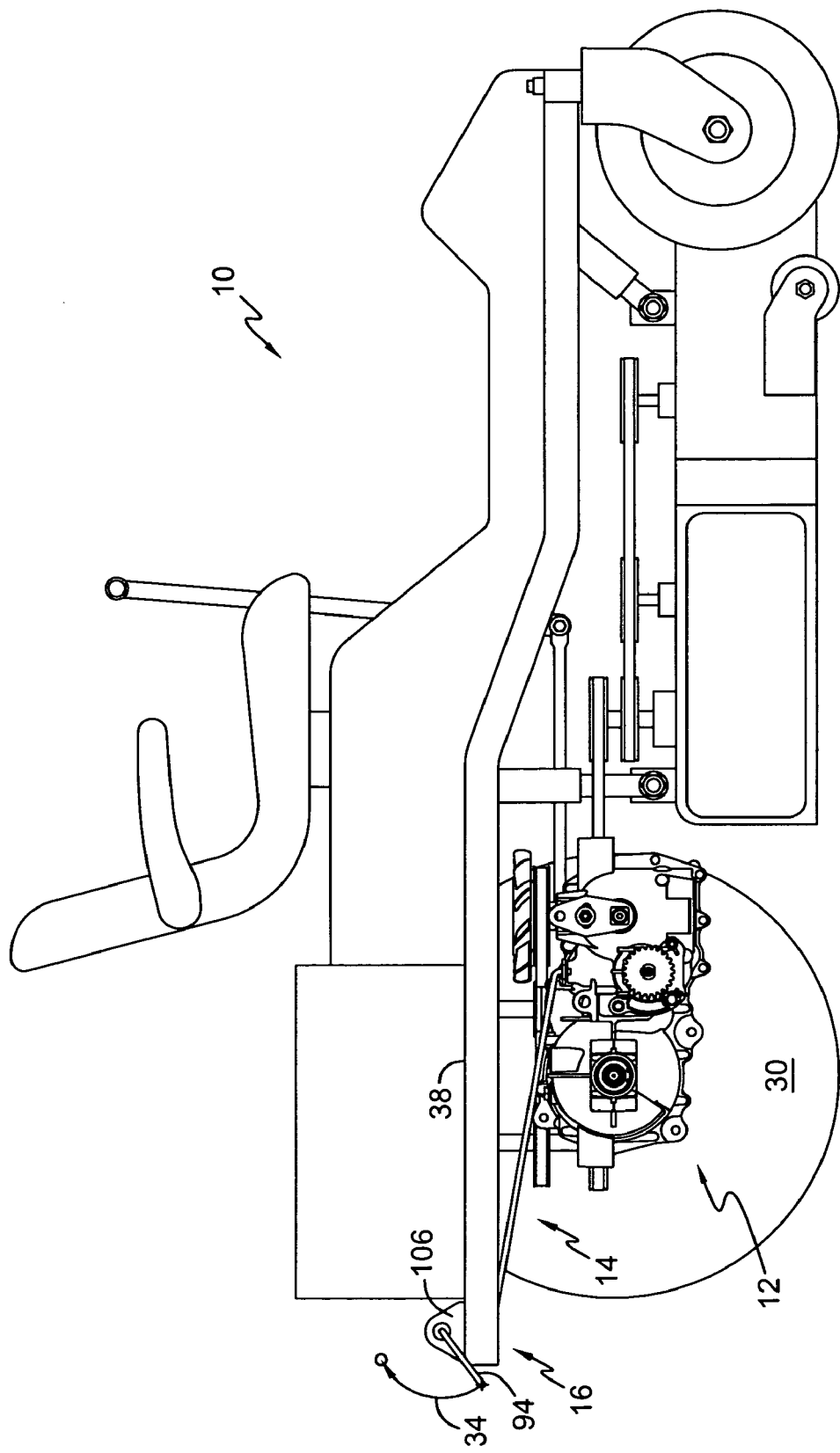
FIG. 1 illustrates a side view of one embodiment of a vehicle, made in accordance with the tenets and teachings of the Present Invention.

The Present Invention herein is discussed in relation to lawn tractors generally possessing HZT systems. However, other uses will be apparent from the tenets and teachings disclosed herein. The Present Invention will be better understood from the following detailed description of exemplary embodiments with reference to the attached Figures, wherein like reference numerals and characters are intended to refer to like parts, and by reference to the following Claims.

FIG. 1 depicts vehicle 10. Referring to FIG. 1, vehicle 10 comprises zero-turn transaxle assembly 12, and illustrates the relationship of zero-turn transaxle assembly 12 to vehicle 10. Further, a bypass linkage assembly 14 is also illustrated in FIG. 1 as being mounted to rear portion 16 of vehicle 10. In the embodiment illustrated in FIG. 1, bypass linkage assembly 14 is illustrated in the "off," deactivated or disengaged position. It should be noted that while the embodiments disclosed herein show bypass linkage assembly 14 mounted to and accessible from rear portion 16 of vehicle 10, it will nevertheless be apparent that the bypass mechanisms disclosed herein may be mounted to be accessible from other locations on vehicle 10.

Figure 2:
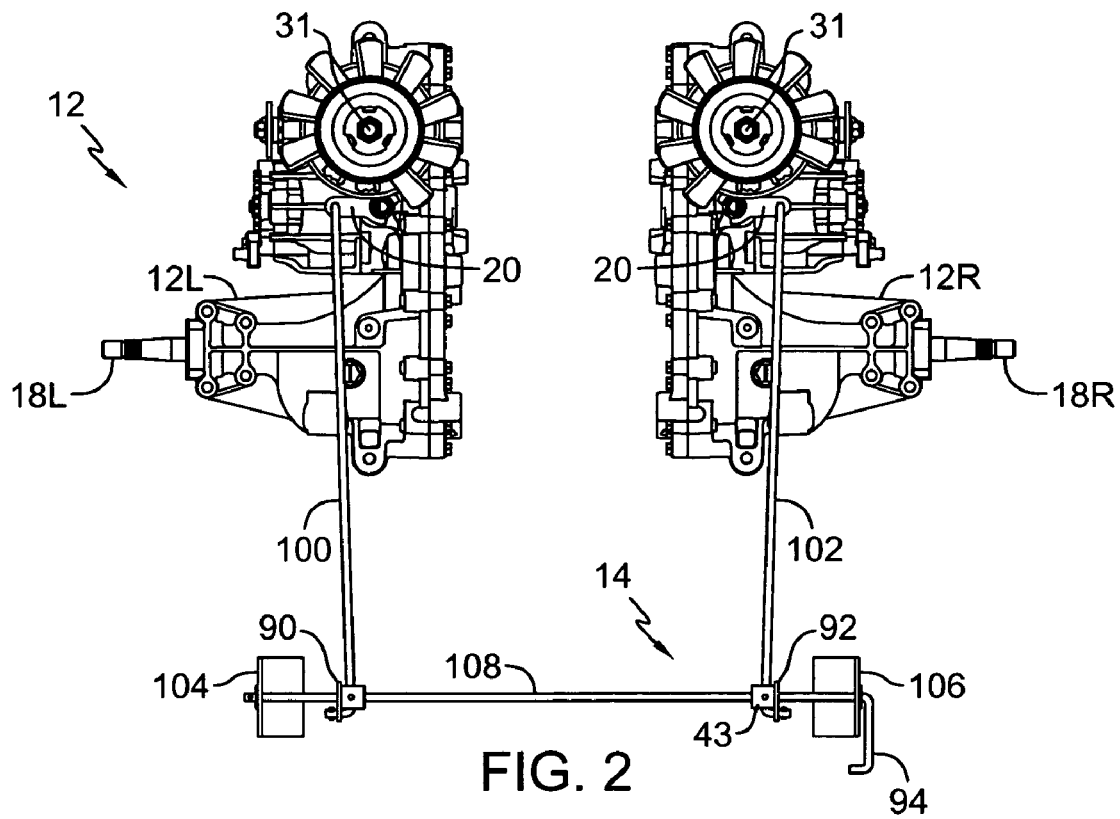
FIG. 2 illustrates a top view of the zero-turn transaxle assembly depicted in the vehicle of FIG. 1, with the bypass linkage assembly installed and illustrated in an "off," deactivated or disengaged position.
Figure 3:
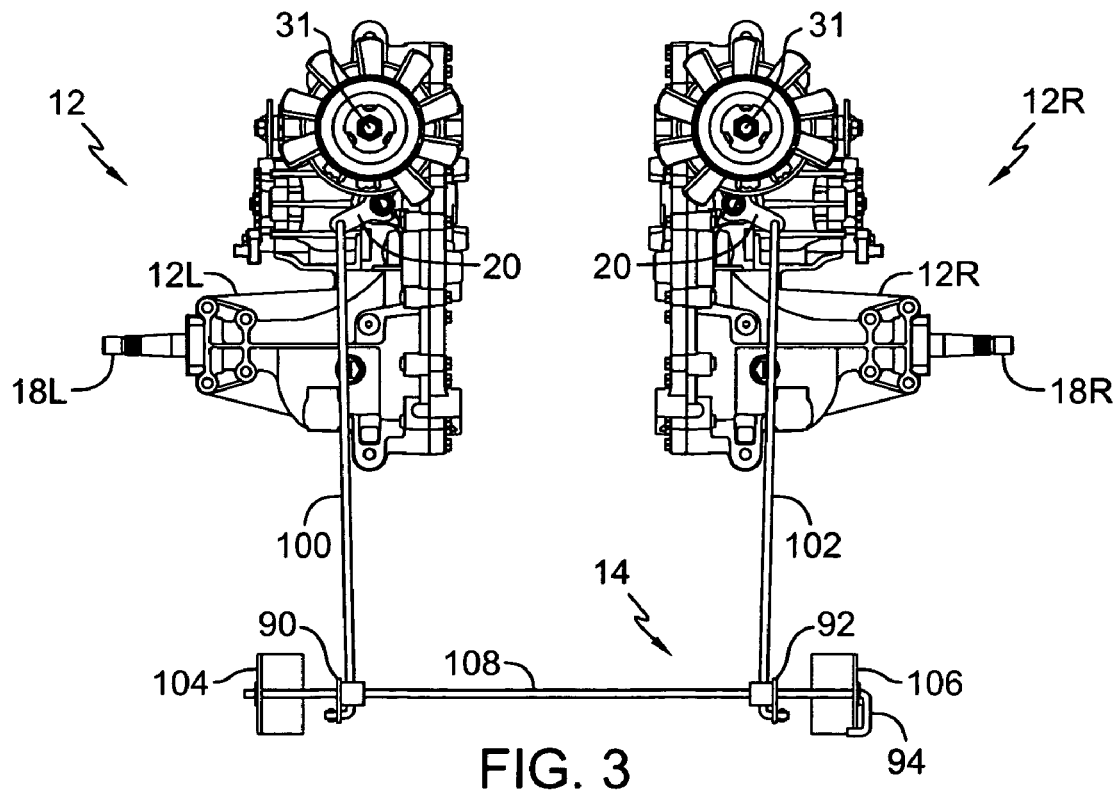
FIG. 3 illustrates a top view of the zero-turn transaxle assembly depicted in FIG. 2, illustrating the bypass linkage assembly in an "on," activated or engaged position.

FIG. 2 depicts a top view of the zero-turn transaxle assembly 12 of FIG. 1 according to one embodiment of the Present Invention. Similarly, FIG. 3 also illustrates a top view of the zero-turn transaxle assembly 12 of FIG. 1; however, the embodiment illustrated in FIG. 3 is of bypass linkage assembly 14 in the "on," activated or engaged position, while FIG. 2 illustrates bypass linkage assembly 14 in the "off," deactivated or disengaged position. Referring to FIG. 2, zero turn transaxle assembly 12 is illustrated as comprising a pair of HZTs 12L and 12R. Each HZT 12L and 12R is used to independently drive axle shafts 18L and 18R, respectively.

Referring to FIGS. 1–3, bypass linkage assembly 14 is illustrated as comprising left actuating link 100, right actuating link 102, left mounting mechanism 104, right mounting mechanism 106, cross-bar link 108, left pivot link 90, right pivot link 92 and handle portion 94.

As illustrated in FIGS. 1–3, left actuating link 100 and right actuating link 102 extend from zero-turn HZTs 12L and 12R, respectively, and are coupled to cross-bar link 108 via mating with left pivot link 90 and right pivot link 92, respectively. It is preferable that left pivot link 90 and right pivot link 92 are disposed, vis-à-vis left actuating link 100 and right actuating link 102, respectively, in an over-center pivot relationship; however, alternative relationships are contemplated. It is also preferable that actuating links 100 and 102 are moveably attached to pivot links 90 and 92.

Left mounting mechanism 104 and right mounting mechanism 106, which receive opposing ends of cross-bar link 108, are preferably mounted to rear portion 16 of vehicle 10 via any currently-known means. As shown in FIG. 1, such mounting may be on a horizontal frame portion 38.

As illustrated most clearly in FIGS. 2 and 3, each end of cross-bar link 108 extends through one of left and right mounting mechanisms 104 and 106, and one end is formed into handle portion 94. Handle portion 94 of bypass linkage assembly 14 preferably provides a means by which the operator of vehicle 10 can place vehicle 10 in and out of bypass mode. Preferably, handle 94 is shaped to provide for ease of use.

Figure 4:
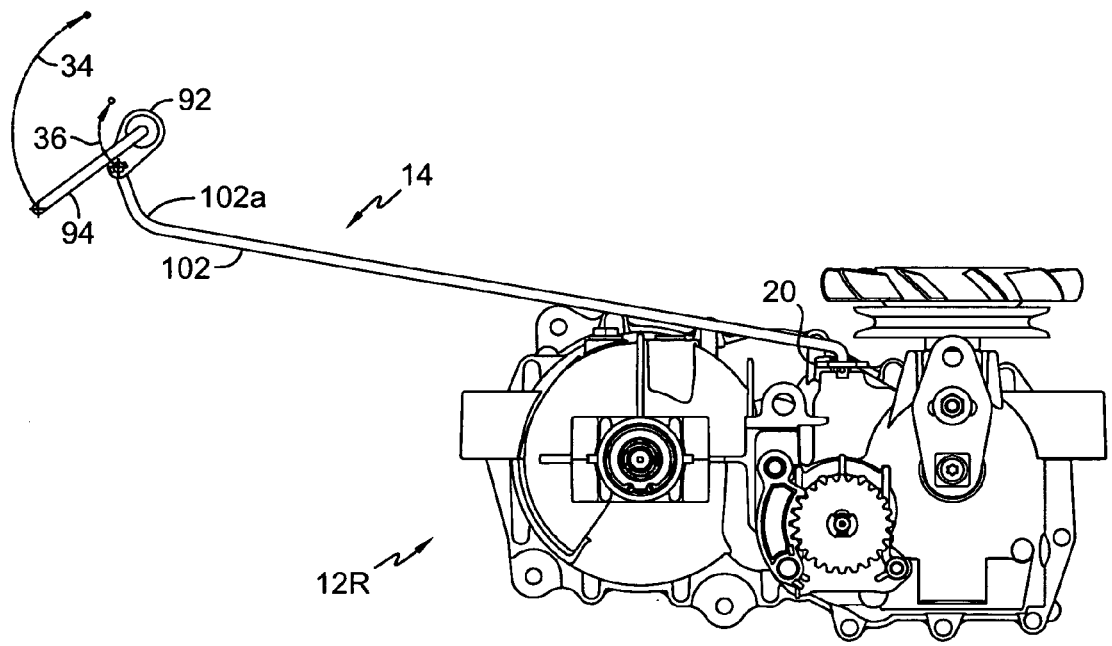
FIG. 4 illustrates a side view of the zero-turn transaxle assembly depicted in FIG. 2.
Figure 5:
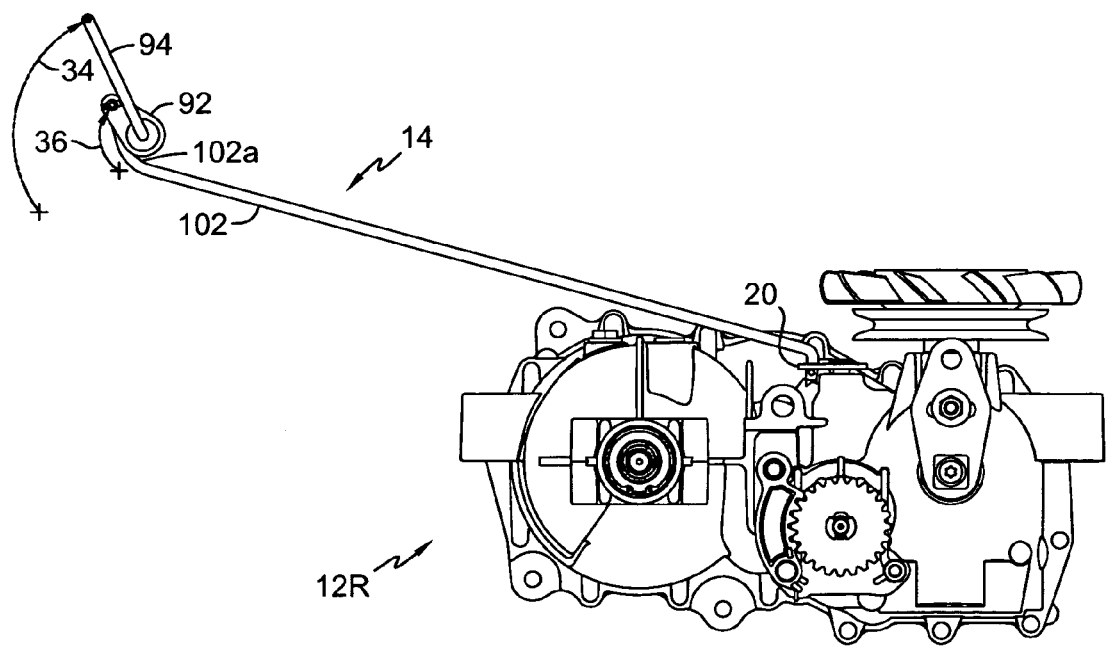
FIG. 5 illustrates a side view of the zero-turn transaxle assembly depicted in FIG. 3.

FIG. 4 depicts a side view of HZT 12R of FIG. 2; that is, with bypass linkage assembly 14 in the "off," deactivated or disengaged state. Conversely, FIG. 5 illustrates a side view of HZT 12R of FIG. 3; that is, with bypass linkage assembly 14 in the "on," activated or engaged state. Referring to FIGS. 4 and 5, bypass linkage assembly 14 is illustrated as being coupled to bypass arm 20.

Figure 6:
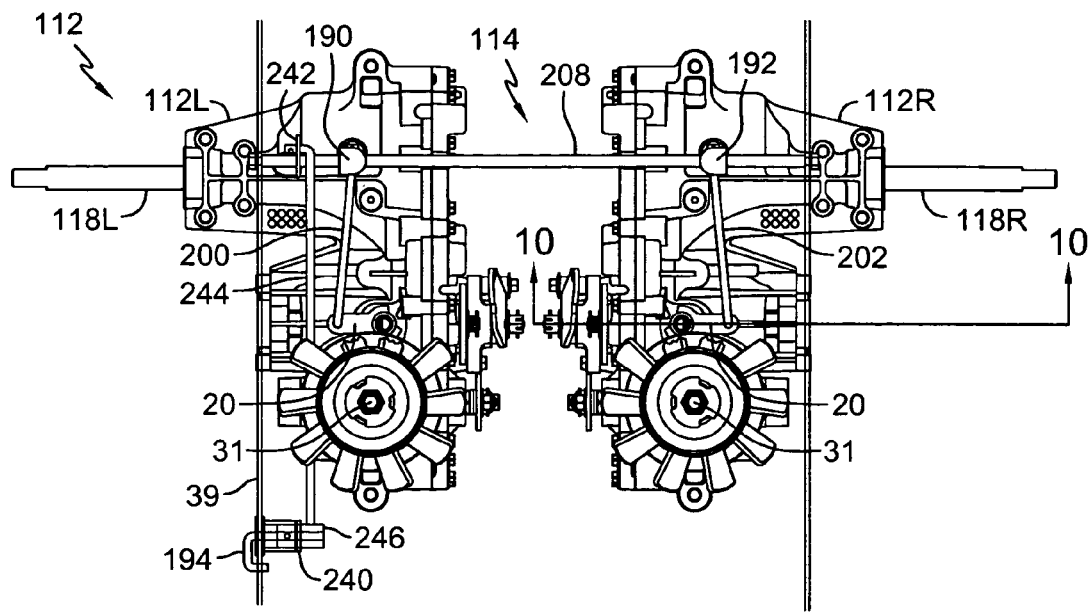
FIG. 6 illustrates a top view of a second embodiment of a zero-turn transaxle assembly, with the bypass linkage assembly installed and illustrated in an "off," deactivated or disengaged position.
Figure 7:
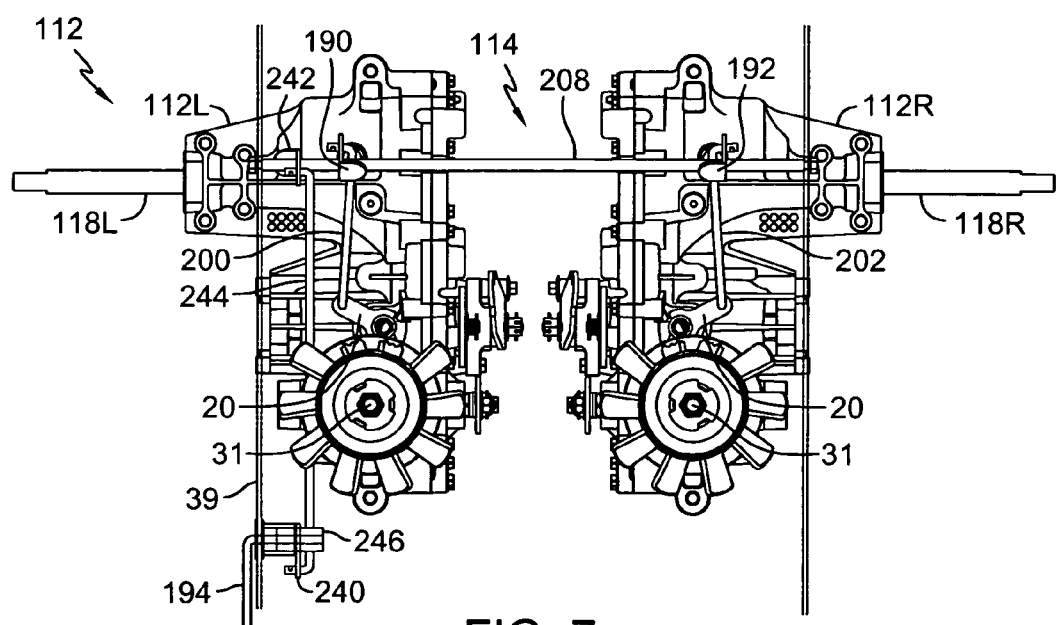
FIG. 7 illustrates a top view of the zero-turn transaxle assembly depicted in FIG. 6, illustrating bypass linkage assembly in an "on," activated or engaged position.

A second embodiment bypass linkage assembly 114 is illustrated in FIGS. 6–9. Referring to FIG. 6, which—like FIG. 2—illustrates a top view of zero-turn transaxle assembly 112, zero-turn transaxle assembly 112 is illustrated as comprising a pair of HZTs 112L and 112R. Further, each HZT 112L and 112R is used to drive axle shafts 118L and 118R, respectively. Similar to FIG. 2, the embodiment illustrated in FIG. 6 illustrates bypass linkage assembly 114 in the "off," deactivated or disengaged position. Similarly, FIG. 7, like FIG. 3, illustrates bypass linkage assembly 114 in the "on," activated or engaged position.

While bypass linkage assembly 114 is similar to the first embodiment disclosed above and realizes similar functions, bypass linkage assembly 114 does, in fact, contain some differing features. First embodiment zero-turn transaxle assembly 12 is positioned in vehicle 10 in a first orientation. Second embodiment zero-turn transaxle assembly 112 is positioned in a second orientation opposite the first orientation. In order to have bypass handle 194 positioned toward the rear portion 16 of vehicle 10, second embodiment bypass linkage assembly 114 requires additional elements because bypass arms 20 in this embodiment actuate in the same direction relative to each individual transaxle 112L and 112R as in the first embodiment. That is, bypass linkage assembly 14 causes arms 20 to move rearward while bypass linkage assembly 114 causes arms 20 to move forward. As previously noted, positioning bypass linkage assembly 14 and bypass linkage assembly 114 to be activated or actuated from a different area of the vehicle may reverse the actuation orientations described with respect to vehicle 10.

Referring to FIGS. 6–9, bypass linkage assembly 114 is illustrated as comprising left actuating link 200, right actuating link 202, cross bar link 208, left pivot link 190, right pivot link 192, handle pivot link 242, handle link 244, handle portion pivot link 240 and handle portion 194.

Left actuating link 200 and right actuating link 202 extend from zero-turn HZTs 112L and 112R, respectively, and are coupled to cross-bar link 208 via mating with left pivot link 190 and right pivot link 192, respectively. It is preferable that left pivot link 190 and right pivot link 192 are disposed, vis-à-vis left actuating link 200 and right actuating link 202, respectively, in an over-center pivot relationship; however, alternative relationships are nevertheless contemplated. It is also preferable that actuating links 200 and 202 are rotatably mounted to pivot links 190 and 192, respectively. Cross bar link 208 extends through pivot links 190 and 192. Mated to one end of cross bar link 208 is handle pivot link 242.

Figure 8:
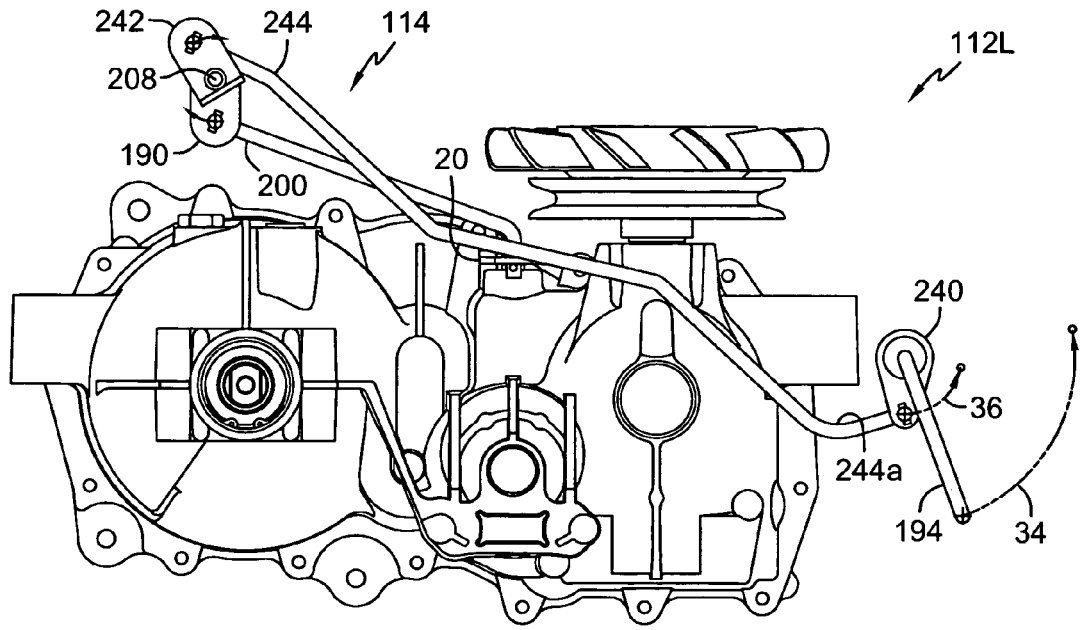
FIG. 8 illustrates a side view of the zero-turn transaxle assembly depicted in FIG. 6.
Figure 9:
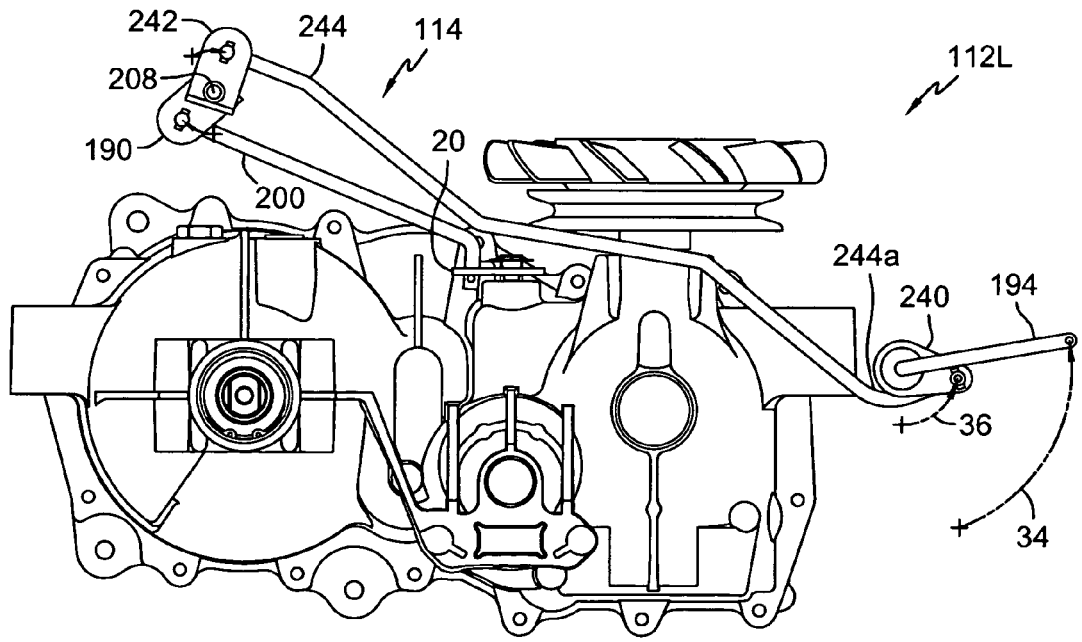
FIG. 9 illustrates a side view of the zero-turn transaxle assembly depicted in FIG. 7.

Coupled to handle pivot link 242 is handle link 244. As illustrated in FIGS. 8 and 9, which show side views of HZT 112L and bypass linkage assembly 114, with bypass linkage assembly 114 in the deactivated and activated states, respectively, handle link 244 traverses in a generally downward trajectory so as not to interfere with the various aspects of HZT 112L. The end of handle link 244 is coupled to handle portion 194, which is mated to handle link 244 via handle portion pivot link 240. Handle portion 194 of bypass linkage assembly 114 preferably provides a means by which the operator of a vehicle can place the vehicle in and out of bypass mode. Preferably, handle 194 is shaped to provide for ease of use.

FIGS. 8 and 9 also depict, similar to FIGS. 4 and 5, bypass linkage assembly 114 as being coupled to bypass arm 20.

Figure 10:
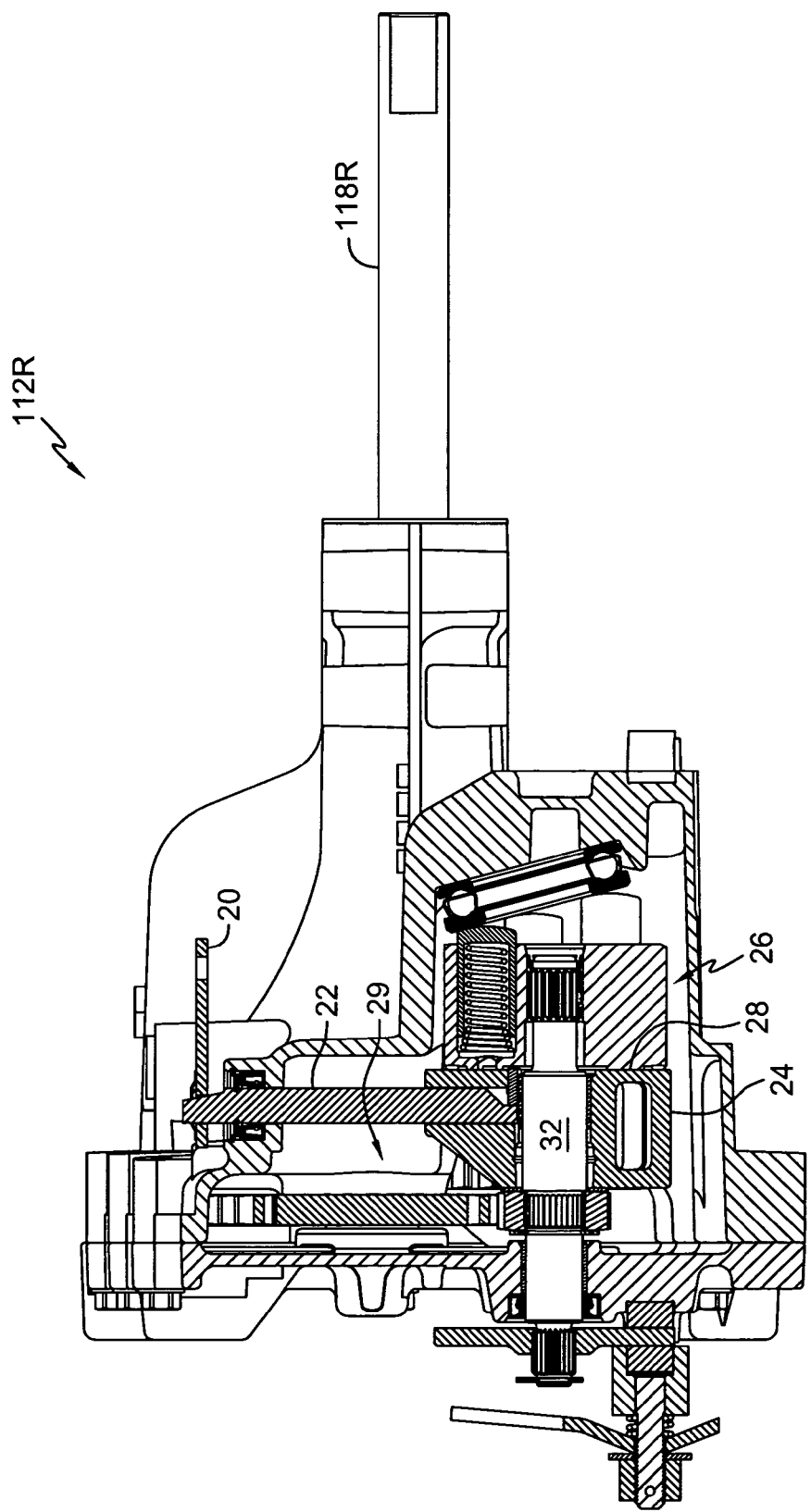
FIG. 10 illustrates a cross-sectional view of one of the zero-turn transaxles depicted in FIG. 6, along line 10—10.

FIG. 10 illustrates a cross-section of HZT 112R taken along line 10—10 of FIG. 6.

Although FIG. 10 is taken from second embodiment bypass linkage assembly 114, FIG. 10 concerns the inner workings of HZT 112R, and, thus, is applicable to both embodiments of bypass linkage assembly 14 and 114. Referring to FIG. 10, bypass arm 20 is linked to bypass actuator 22 which, in turn, interfaces with center section 24 at its distal end. Bypass actuator 22 preferably has a cam portion that, when rotated by rotation of bypass arm 20, can be used to move a puck, pin or the like to lift hydraulic motor 26 off the motor running surface 28 of center section 24. This process causes a break in the generally-closed hydraulic circuit, thereby allowing HZT 112R to enter bypass mode.

Referring to FIGS. 1 and 10, if vehicle 10 is pushed in the bypass mode, wheels 30 will rotate the respective transaxle axles, thereby causing rotation of various elements of gear train 29 and, thus, motor shaft 32. As motor shaft 32 rotates, it will further cause rotation of hydraulic motor 26, causing hydraulic motor 26 to pump hydraulic fluid through center section 24. When bypass arm 20 is returned to the deactivated position, bypass actuator 22 returns to the deactivated position. At this time, if vehicle 10 is pushed, any hydraulic fluid pumped by hydraulic motor 26 through center section 24 attempts to rotate the hydraulic pump (not shown) and thus input shaft 31, making vehicle 10 difficult to move.

In the embodiments shown, to actuate bypass arm 20, an operator of vehicle 10 would move handle portion 94 or 194 in a generally upward direction. This direction is illustrated by direction arrow 34 in FIGS. 1, 4, 5, 8 and 9, with "+" marking the starting spot, and "o" marking the termination point. Movement of cross bar link 108 or 208 causes actuating links 100 and 102 to move towards rear portion 16 of vehicle 10, or actuating links 200 and 202 to move away from rear portion 16 of vehicle 10, thereby causing bypass arm 20 to be pulled, placing transaxies 12R and 12L or 112R and 112L in a bypass mode. While the embodiments shown have handle 94 or 194 operating in an upward direction, linkages 14 and 114 could readily be configured to have handle 94 or 194 operate in a downward direction and, therefore, the direction of actuation should not be seen as limiting.

As illustrated, bypass linkage assemblies 14 and 114 include an over-center feature, meaning that the line of action between bypass arm 20 and pivot links 90 and 92 or 190 and 192 passes over the center of rotation of pivot links 90 and 92 or 190 and 192, as exemplified by direction arrow line 36. Portion 102a of actuating link 102, which would correspond to a similar portion of actuating link 100, stops against sleeve portion 43 of pivot link 92. Similarly, portion 244a in second embodiment bypass linkage assembly 114 stops against a handle support portion 246. Handle support portion 246 may be attached to a horizontal surface 38 similar to the first embodiment or to a vertical frame portion 39 that may also be adjacent to rear portion 16 of vehicle 10.

While the Present Invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification, including the drawings, as warranted.

What is claimed is:

1. A vehicle comprising:
   a first hydraulic pump;
   a first hydraulic motor connected to the first hydraulic pump by a first hydraulic porting, wherein the first hydraulic pump, first hydraulic motor and first hydraulic porting are located in a first housing;
   a first axle shaft driven by the first hydraulic motor;
   a second hydraulic pump;
   a second hydraulic motor connected to the second hydraulic pump by a second hydraulic porting, wherein the second hydraulic pump, second hydraulic motor and second hydraulic porting are located in a second housing;
   a second axle shaft driven by the second hydraulic motor;
   a first bypass associated with the first hydraulic porting and located in the first housing;
   a first linkage connected to the first bypass;
   a second bypass associated with the second hydraulic porting and located in the second housing; and
   a second linkage connected to the second bypass;
   wherein the first bypass and the second bypass are actuated substantially simultaneously by a single actuating mechanism.

2. The vehicle of claim 1, wherein each bypass comprises lifting a motor block from a running surface formed on a center section in which is contained at least a portion of the hydraulic porting.

3. The vehicle of claim 1, wherein at least one portion of the linkages and the actuating mechanism comprises an over-center mechanism to maintain the bypass condition once actuated.

4. The vehicle of claim 1, wherein the actuating mechanism comprises a handle portion located at the rear of the vehicle.

5. The vehicle of claim 1 wherein the actuating mechanism comprises a handle portion located at a side of the vehicle.

6. A vehicle comprising:
- a pair of hydraulic drive devices, each driving a separate output axle;
- a pair of bypass mechanisms, one associated with each of the pair of hydraulic drive devices;
- a linkage comprising a first actuating link extending from one of the bypass mechanisms, a second actuating link extending from the other of the bypass mechanisms, and a cross member external to both hydraulic drive devices and extending generally parallel to the output axles and perpendicular to the first and second actuating links; and
- a handle connected to the linkage wherein movement of the handle causes both bypass mechanisms to be actuated.

7. The vehicle of claim 6, wherein each of the pair of hydraulic drive devices is an integrated hydrostatic transaxle.

8. The vehicle of claim 6, wherein bypass is achieved by moving a motor cylinder block away from a center section running surface.

9. The vehicle of claim 6, wherein the vehicle can achieve zero-turn.

10. The vehicle of claim 6, wherein the vehicle is a zero-turn mowing machine.

11. The vehicle of claim 6, wherein the handle is mounted on a horizontal vehicle support.

12. The vehicle of claim 6, wherein the handle is mounted on a vertical vehicle support.

13. The vehicle of claim 6, wherein the hydraulic drive devices are located in separate housings.

14. A method of placing a pair of hydrostatic closed loop systems in a bypass mode, comprising actuation of a single handle connected to a linkage system that is connected to a pair of bypass actuators, thereby placing both hydrostatic closed loop systems in a bypass mode, wherein each hydrostatic closed loop system is located in a separate housing.

15. The method of claim 14, wherein the linkage system comprises an over-center feature to maintain the bypass condition of the pair of hydrostatic closed loop systems once attained.

16. The method of claim 14, wherein the bypass actuators are moved by a bypass arm attached to the bypass actuators, and the direction of movement is away from the rear of the vehicle.

17. The method of claim 14, wherein the bypass actuators are moved by a bypass arm attached to the bypass actuators, and the direction of movement is toward the rear of the vehicle.

18. The method of claim 14, wherein each of the pair of hydrostatic closed loop systems drives a single output shaft.

19. The method of claim 14, wherein the pair of hydrostatic closed loop systems is mounted within a mowing machine and serve to drive a pair of axle shafts.

20. The method of claim 19, wherein the mowing machine has zero-turn capability.

* * * * *